No. 830,964. PATENTED SEPT. 11, 1906.
P. BULGER.
NUT AND BOLT LOCK.
APPLICATION FILED OCT. 5, 1905.
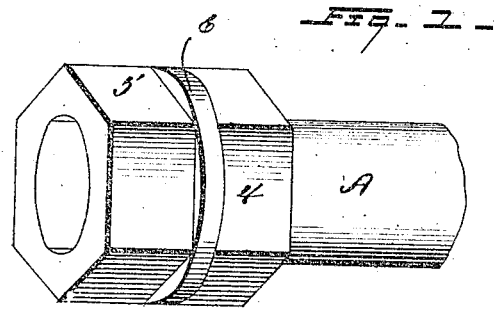
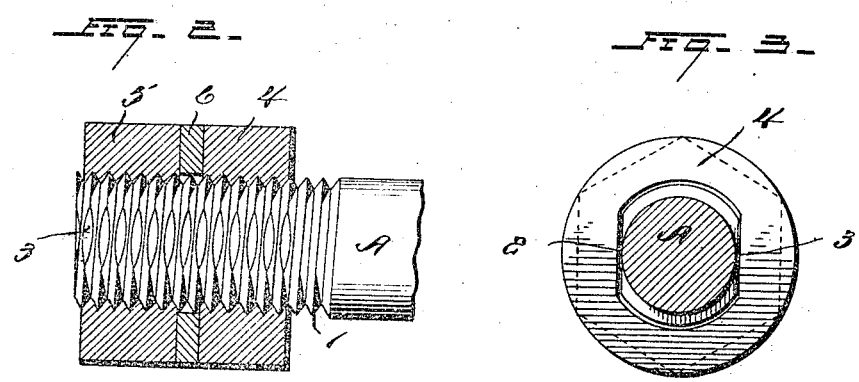
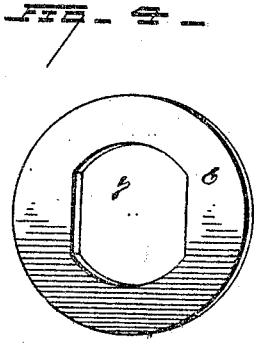
WITNESSES:
INVENTOR
Peter Bulger
By Wm. H. Bates
Attorney

UNITED STATES PATENT OFFICE.

PETER BULGER, OF STURGEON, PENNSYLVANIA.

NUT AND BOLT LOCK.

No. 830,964.   Specification of Letters Patent.   Patented Sept. 11, 1906.

Application filed October 5, 1905. Serial No. 281,454.

*To all whom it may concern:*

Be it known that I, PETER BULGER, a citizen of the United States, residing at Sturgeon, in the county of Allegheny and State of Pennsylvania, have invented new and useful Improvements in Nut and Bolt Locks, of which the following is a specification.

My invention relates to improvements in nut and bolt locks; and the object is to provide a simplified and improved device of the kind named and for the purposes intended where by fastening-nuts will be held locked against removal or disturbance by jar, agitation, vibration, or other disturbance or be liable to become unlocked or loosened by exigencies incident to the uses to which the device may be subjected.

I accomplish this object and all adjunctive thereto by the means illustrated in the accompanying drawings, wherein—

Figure 1 is a perspective view showing a bolt fully equipped with my improved locking device. Fig. 2 is a longitudinal central section through the locking-nuts and the interposed locking-washer disposed on the bolt. Fig. 3 is a transverse section through the bolt and face elevation of the locking-washer, the inner nut being indicated by dotted lines. Fig. 4 is a detailed view of the locking-washer used between the thread-nuts.

It will be premised that the improvements are adapted to all bolts wherein it is desired to hold nuts to the bolt so that they will be held in place against turning or loosening after having been tightened up on the bolt and that the improvements are specially adapted to hold nuts projected through the rims of pulleys by disposing the bolts through the pulley and screwing the bolt into the nut and clamping the latter against the washers.

Referring to the drawings, A designates the bolt, which may be of any desired length and threaded for such a distance as may be required to meet the uses intended, as seen at 1. On opposite sides of the threaded portion of the bolt the threads are cut off, leaving opposite flat surfaces 2 3, so as to hold the locking-washer from rotation when placed in position on the threaded portion of the bolt between the nuts. The threads of the bolt are uniform throughout; but in order to increase the bite of the nuts the inner one may be provided with, say, five threads and the outer be provided with six threads, so as to have stronger binding-surface, as shown in the drawings.

4 designates the inner or base nut, which fits the thread of the bolt in the usual manner, and 5 designates the setting or locking nut, which is screwed up against the metal washer.

6 designates the metal washer, made of suitable iron or steel and has plane smooth faces and is provided with a central aperture 7, cut to the contour of the threaded portion of the bolt, the aperture being of a size to readily slip over the threads and is held against turning, as is apparent. The perimeter of the metal washer is made round, so that it may present as little obstruction to exterior objects as possible.

The elements constituting my improved locking device, as mentioned heretofore, may be applied in all instances where nuts may be applied and required to be locked against turning or loosening—such as set-nuts on bolts used for different purposes, binding fish-plates to rail-joints, clamping pulley-plates together, and wherever bolts may be useful in securing parts together so that the fastening-bolts will not become loose because of the nuts becoming moved.

To assemble the elements in operative position, the bolt having been disposed in position, the inner nut is screwed up into clamping position. The metal washer is then slipped on the bolt and lodged against the outer face of the inner nut. The outer nut 5 is then screwed up against the face of the washer and is there held firmly locked by direct pressure and contact with such rigidity and security that its outer nut cannot be turned back even by a strong wrench. In applying the nuts they may be screwed up at the same time with the metal washer between them, the washer sliding on the bolt as the nuts progress into position. Then when the connection is completed the outer nut is clamped up. Should it become necessary to remove the bolt, the inner nut can be loosened up by a very short turn. Then the outer nut may be removed easily.

What I claim is—

The bolt and nut lock herein described, consisting of a bolt the flattened sides of which extend over the screw-threads, a fastening-nut on the bolt, a metal washer having plane and smooth faces and of uniform thickness, and having a central aperture shaped to the contour of the threaded flattened portions of the bolt and arranged adjustably thereon, and a clamping-nut to move the washer against the fastening-nut and thus hold both nuts against turning substantially as shown and described.

In testimony whereof I affix my signature in presence of two subscribing witnesses.

PETER BULGER.

Witnesses:
A. G. HEYLMUN,
C. M. FORREST.